(12) United States Patent
Moore et al.

(10) Patent No.: US 8,626,465 B2
(45) Date of Patent: Jan. 7, 2014

(54) CALIBRATING SENSOR MEASUREMENTS ON MOBILE DEVICES

(75) Inventors: Christopher Moore, San Francisco, CA (US); Brian Michael King, Santa Cruz, CA (US); William Matthew Vieta, San Jose, CA (US); Xiaoyuan Tu, Sunnyvale, CA (US); Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 610 days.

(21) Appl. No.: 12/886,494

(22) Filed: Sep. 20, 2010

(65) Prior Publication Data

US 2011/0246117 A1  Oct. 6, 2011

Related U.S. Application Data

(60) Provisional application No. 61/319,139, filed on Mar. 30, 2010.

(51) Int. Cl.
  *G01C 17/38* (2006.01)

(52) U.S. Cl.
  USPC .................. 702/99; 702/92; 702/93; 702/141; 702/150

(58) Field of Classification Search
  USPC ............... 702/92, 93, 99, 130, 136, 150–153; 701/211, 216, 300; 340/995.12, 340/995.24, 995.27
  See application file for complete search history.

(56) References Cited

U.S. PATENT DOCUMENTS

| | | |
|---|---|---|
| 5,075,693 A | 12/1991 | McMillan et al. |
| 5,165,269 A | 11/1992 | Nguyen |
| 5,349,529 A | 9/1994 | Masumoto et al. |
| 5,761,094 A | 6/1998 | Olson et al. |
| 5,946,813 A | 9/1999 | Nachbaur et al. |
| 6,311,129 B1 | 10/2001 | Lin |
| 6,384,384 B1 | 5/2002 | Connolly et al. |
| 6,408,245 B1 | 6/2002 | An et al. |
| 6,424,914 B1 | 7/2002 | Lin |
| 6,508,316 B2 | 1/2003 | Estes et al. |
| 6,539,639 B2 | 4/2003 | Smith |
| 6,622,091 B2 | 9/2003 | Perlmutter et al. |
| 6,651,003 B2 | 11/2003 | Woloszyk et al. |

(Continued)

FOREIGN PATENT DOCUMENTS

| | | |
|---|---|---|
| EP | 1 221 586 | 7/2002 |
| JP | 2005-134343 | 5/2005 |
| WO | WO 2008/122904 | 10/2008 |
| WO | WO 2009/068116 | 6/2009 |

OTHER PUBLICATIONS

Seong Yun Cho et al., "A Calibration Technique for a Two-Axis Magnetic Compass in Telematics Devices," Jun. 2005, *ETRI Journal*, 27( 3):280-288.

(Continued)

*Primary Examiner* — Sujoy Kundu
(74) *Attorney, Agent, or Firm* — Fish & Richardson P.C.

(57) ABSTRACT

Sensor measurements are used to detect when a device incorporating the sensor is stationary. While the device is stationary, sensor measurements at a current device temperature are used to estimate model parameters. The model parameters can be used in a state estimator to provide an estimated attitude that can be provided to other applications. In some implementations, the estimated attitude can be used to mitigate interference in other sensor measurements.

20 Claims, 4 Drawing Sheets

(56) References Cited

U.S. PATENT DOCUMENTS

| | | | |
|---|---|---|---|
| 6,768,452 | B2 | 7/2004 | Gilkes |
| 6,807,485 | B1 | 10/2004 | Green |
| 6,964,107 | B1 | 11/2005 | Ahola |
| 6,988,049 | B1 | 1/2006 | Wirtz et al. |
| 7,196,660 | B2 | 3/2007 | Abraham |
| 7,210,236 | B2 | 5/2007 | Sato et al |
| 7,248,983 | B2 | 7/2007 | Fillatreau et al. |
| 7,275,008 | B2 | 9/2007 | Plyvanainen |
| 7,324,906 | B2 | 1/2008 | Sato et al. |
| 7,331,115 | B2 | 2/2008 | Schierbeek et al. |
| 7,346,452 | B2 | 3/2008 | Ford et al. |
| 7,388,541 | B1 | 6/2008 | Yang |
| 7,391,366 | B2 | 6/2008 | Park et al. |
| 7,400,974 | B2 | 7/2008 | Fuchs et al. |
| 7,415,354 | B2 | 8/2008 | Alexander |
| 7,451,549 | B1 | 11/2008 | Sodhi et al. |
| 7,458,166 | B2 | 12/2008 | Parks et al. |
| 7,548,200 | B2 | 6/2009 | Garin |
| 7,565,839 | B2 | 7/2009 | Stewart et al. |
| 8,061,049 | B2 | 11/2011 | Mayor et al. |
| 2003/0135327 | A1 | 7/2003 | Levine et al. |
| 2005/0174324 | A1 | 8/2005 | Liberty et al. |
| 2005/0223575 | A1 | 10/2005 | Fillatreau et al. |
| 2005/0240347 | A1 | 10/2005 | Yang |
| 2005/0246099 | A1 | 11/2005 | Jendbro et al. |
| 2005/0288805 | A1 | 12/2005 | Moore |
| 2006/0066295 | A1* | 3/2006 | Tamura et al. ............... 324/202 |
| 2006/0190174 | A1 | 8/2006 | Li et al. |
| 2006/0195254 | A1 | 8/2006 | Ladetto et al. |
| 2006/0271295 | A1 | 11/2006 | McLaren et al. |
| 2007/0156337 | A1 | 7/2007 | Yanni |
| 2008/0066331 | A1 | 3/2008 | Brzezinski et al. |
| 2008/0143595 | A1 | 6/2008 | Colley et al. |
| 2008/0147686 | A1 | 6/2008 | Colley et al. |
| 2008/0201096 | A1 | 8/2008 | Wright et al. |
| 2009/0033807 | A1* | 2/2009 | Sheng et al. ................ 348/734 |
| 2009/0054075 | A1 | 2/2009 | Boejer |
| 2009/0070058 | A1 | 3/2009 | Lin |
| 2009/0089001 | A1 | 4/2009 | Lin |
| 2009/0171607 | A1 | 7/2009 | Chen et al. |
| 2009/0172599 | A1 | 7/2009 | Nezu |
| 2009/0326851 | A1 | 12/2009 | Tanenhaus |
| 2010/0121599 | A1 | 5/2010 | Boeve et al. |
| 2010/0305853 | A1 | 12/2010 | Schulze et al. |
| 2011/0106474 | A1 | 5/2011 | Kulik et al. |

OTHER PUBLICATIONS

Chris M. Goulet, "Magnetic Declination, Frequently Asked Questions," Oct. 2001, Version 4.4, [Online] [Retrieved on May 16, 2009]. Retrieved from the Internet: URL: http://www.geocities.com/magnetic_declination/, 16 pages.

PNI Sensor Corporation, "Calibration Computations for Practical Compassing using the PNI-11096 Magnetometer ASIC", Aug. 2008, PNI Corporation © 2001, Santa Rosa, CA, 3 pages.

PNI Sensor Corporation, "Multipoint Calibration Primer", (no publication date available), PNI Corporation, Santa Rosa, CA, 10 pages.

An Overview of the Earth's Magnetic Field, "The Earth's Magnetic Field—An Overview", [Online] [Retrieved on May 16, 2009]. Retrieved from the Internet: URL: http://www.geomag.bgs.ac.uk/earthmag.html, 10 pages.

The Earth's magnetic field, EPS 122: Lecture 5—Earth's magnetic field, 11 pages.

Apptism, iTopoMaps, © 2009 Apptism, [Online] [Retrieved on Jun. 2, 2009]. Retrieved from the Internet: URL: http://www.apptism.com/apps/itopomaps, 4 pages.

Apptism, Compass Go, © 2009 Apptism, [Online] [Retrieved on Jun. 3, 2009]. Retrieved from the Internet: URL: http://www.apptism.com/apps/compass-go, 2 pages.

Apptism, Focalware, © 2009 Apptism, [Online] [Retrieved on Jun. 3, 2009]. Retrieved from the Internet: URL: http://www.apptism.com/apps/focalware, 2 pages.

Harper et al., "Process for Improving GPS acquisition assistance data and server-side location determination for cellular networks," *2004 Intl Symp on GNSS/GPS*, Dec. 6-8, 2004, Sydney, Australia, 15 pages.

Zhang and Gao, "A Novel Auto-calibration Method of the Vector Magnetometer," *Ninth Intl Conf on Electronic Measurement & Instruments*, ICEMI '2009, pp. 1-145 through 1-150.

Camps et al., "Numerical Calibration for 3-Axis Accelerometers and Magnetomors," *IEEE*, 2009, pp. 217-231.

Huang et al., "Automatically Identifying Geographic Direction," U.S. Appl. No. 12/477,865, filed Jun. 3, 2009.

Mayor et al., "Restoring and Storing Magnetometer Calibration Data," U.S. Appl. No. 12/479,483, filed Jun. 5, 2009.

Mayor et al., "Magnetometer Accuracy and Use," U.S. Appl. No. 12/479,717, filed Jun. 5, 2009.

Mayor et al., "Context Determination to Assist Location Determination Accuracy," U.S. Appl. No. 12/549,250, filed Aug. 27, 2009.

Piemonte et al., "Dynamic Compass Calibration in a Portable Device," U.S. Appl. No. 12/479,203, filed Jun. 5, 2009.

Mayor et al., "Accuracy Indications for an Electronic Compass in a Portable Device," U.S. Appl. No. 12/479,196, filed Jun. 5, 2009.

Piemonte et al., "Determining Heading Using Magnetometer Data and angular Rate Data," U.S. Appl. No. 12/886,531, filed Sep. 20, 2010.

Tu, "Magnetometer Calibration," U.S. Appl. No. 12/899,392, filed Oct. 6, 2010.

"Honeywell 3-Axis Digital Compass IC, HMC5843 Electronic Compass," Honeywell International Inc. [online]; retrieved from the Internet: <URL: http://www.honeywell.com/sites/portal?smap=aerospace&page=Magnetic-Sensors3&theme=T15&catID=CF84B17AB-A90F-716D-10BC-A1E75441138E&id=HF916B4E0-4F71-9DB5-DFA8-51B1944918EE&sel=2&se14=1>, retrieved on Jun. 5, 2005, 1 page.

Westerberg, "Compass Go," Apple Apps Store, Oct. 10, 2008, 3 pages.

Mayor et al., Magnetometer Accuracy and Use, U.S. Appl. No. 13/699,403, filed Nov. 5, 2012.

Adiprawita, W., et al., "Development of AHRS (Attitude and Heading Reference System) for Autonomous UAV (Unmanned Aerial Vehicle)," Proceedings of the International Conference on Electrical Engineering and Informatics, Institut Teknologi Bandung, Indonesia, Jun. 17-19, 2007, 4 pages.

* cited by examiner

CALIBRATING SENSOR MEASUREMENTS ON MOBILE DEVICES

CROSS-REFERENCE TO RELATED APPLICATION

This application claims priority to pending U.S. Provisional Application Ser. No. 61/319,139, entitled "Calibrating Sensor Measurements on Mobile Devices", filed on Mar. 30, 2010, the entire contents of which are hereby incorporated by reference.

TECHNICAL FIELD

This disclosure relates generally to calibrating sensor measurements on mobile devices.

BACKGROUND

Angular rate sensors are used to measure the rotational velocity of an object without a fix point for referencing. A Micro-Electro-Mechanical System (MEMS) angular rate sensor (or MEMS gyro) can be incorporated into mobile devices due to its small size, weight and low cost. The principle of operation is based on the Coriolis effect. A MEMS resonator is driven at a certain frequency (e.g., about 10 kHz). Due to the angular rate the Coriolis force excites a second oscillation perpendicular to the first one. This oscillation is proportional to the angular rate and can be measured using capacitive methods. Application examples include but are not limited to: image stabilisation (e.g., in cameras or mobile phones); input devices for virtual reality applications; platform stabilisation; sensors for game consoles; and sensors for navigation systems.

The MEMS gyro is susceptible to bias, scale factor errors, and axis cross-sensitivities, as well as high frequency noise. Cross-axis sensitivity is strongly affected by mounting stresses, while the magnitudes of the bias and scale factor errors are related to external temperature. For example, changes in gyro bias are approximately linear to changes in external temperature. To mitigate the effects of gyro bias, the gyro bias can be estimated using known mathematical formulations and subtracted from the raw gyro data. Calibration using measurements at known angular rates can be used to determine the cross-axis sensitivity. Unfortunately, constraints on processing speed, power and memory can make these mathematical formulations impracticable for applications running on mobile devices with limited resources.

SUMMARY

Sensor measurements are used to detect when a device incorporating the sensor is stationary. While the device is stationary, sensor measurements at a current device temperature are used to estimate model parameters. The model parameters can be used in a state estimator to provide an estimated attitude that can be provided to other applications. In some implementations, the estimated attitude can be used to mitigate interference in other sensor measurements.

The details of one or more implementations of calibrating sensor measurements on mobile devices are set forth in the accompanying drawings and the description below. Other features, aspects, and advantages of calibrating sensor measurements on mobile devices will become apparent from the description, the drawings, and the claims.

BRIEF DESCRIPTION OF THE DRAWINGS

Like reference symbols in the various drawings indicate like elements.

DETAILED DESCRIPTION

Exemplary Sensor Measurement Calibration System

Figure 1:
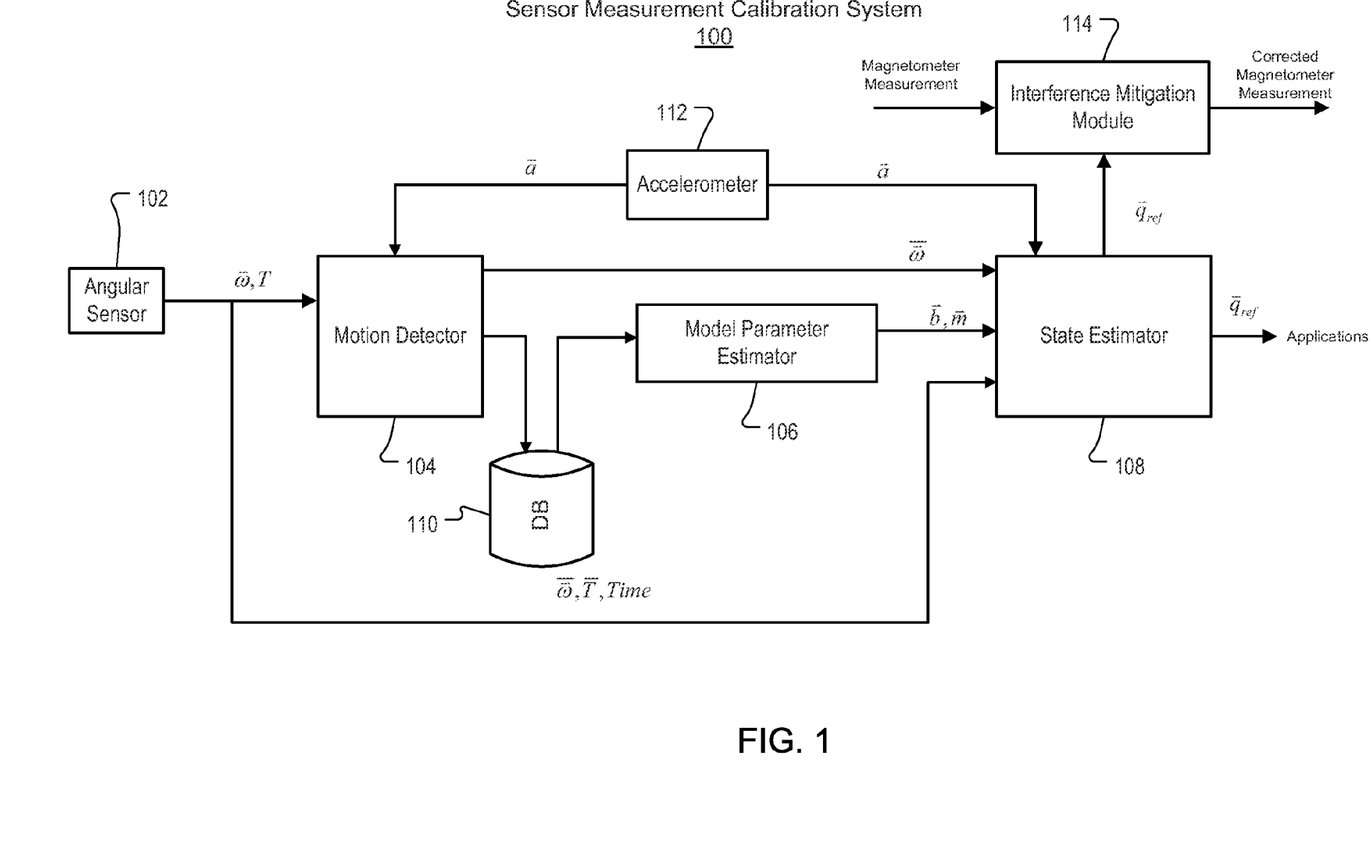
FIG. 1 is a block diagram of an exemplary sensor measurement calibration system.

FIG. 1 is a block diagram of an exemplary sensor measurement calibration system 100. In some implementations, system 100 can include an angular rate sensor 102 (e.g., a MEMS gyro), motion detector 104, model parameter estimator 106, state estimator 108, calibration database 110, accelerometer 112 and an optional interference mitigation module 114. System 100 can be incorporated in a variety of mobile devices, including but not limited to: a handheld computer, a personal digital assistant (PDA), a cellular telephone, an electronic tablet, a network appliance, a digital camera, a video camera, a smart phone, an enhanced general packet radio service (EGPRS) mobile phone, a media player, a navigation device, an email device, a game console, or a combination of any two or more of these devices. In some implementations, some or all of the components of system 100 can be included on one or more integrated circuit (IC) chips.

In some implementations, an attitude of a device can be updated using body angular rates. The body angular rates can be represented by an angular rates vector $\vec{\omega}$. The components of the angular rates vector $\vec{\omega}$ represent angular rates in the x, y and z axes, respectively, in a local coordinate frame of the device. In some implementations, the angular rates vector $\vec{\omega}$ can be measured using three MEMS gyros, one on each of the x, y and z axes of the local coordinate frame.

Generally, the attitude of the device can be represented by a reference quaternion $\vec{q}_{ref}$ a follows:

$$\vec{q}_{ref} = [q_x q_y q_z q_w]^T,$$

$$q_w = \cos(f/2)$$

$$q_x = J_x \sin(f/2)$$

$$q_y = J_y \sin(f/2)$$

$$q_z = J_z \sin(f/2) \tag{1}$$

where
$\vec{J}$ = unit vector along axis of rotation
f = total rotation angle.

A reference quaternion change rate formulation based on a small angle approximation is given by $$\begin{bmatrix} \dot{q}_x \\ \dot{q}_y \\ \dot{q}_z \\ \dot{q}_w \end{bmatrix} = \frac{1}{2} \begin{bmatrix} q_w & -q_z & -q_y \\ q_z & q_w & -q_x \\ q_y & q_x & q_w \\ -q_x & -q_y & -q_z \end{bmatrix} \begin{bmatrix} \omega_x \\ \omega_y \\ \omega_z \end{bmatrix} dt. \tag{2}$$

Equation (2) can be integrated in discrete time to obtain the final attitude of the device represented by reference quaternion $\vec{q}_{ref}$.

The angular rate vector $\vec{\omega}$ is output from angular sensor 102 and input to motion detector 104. Additionally, a current temperature T of the device is input to motion detector 104. The current temperature T can be provided by a temperature sensor in angular sensor 102 or located elsewhere in the device. In some implementations, the angular rate vector $\vec{\omega}$ can be scale-corrected before input into motion detector 104.

In some implementations, motion detector 104 identifies when the device is stationary. Let $\vec{\omega}_1 \ldots \vec{\omega}_n$ be the latest n samples of angular rate from a three axis angular sensor 102, expressed in degrees per second. Let $T_1 \ldots T_n$ be the latest angular sensor temperature samples corresponding to the angular rates $\vec{\omega}_1 \ldots \vec{\omega}_n$.

At each new calibration time t, the following quantities are updated per axis:

$$\bar{\omega} = \frac{1}{n}\sum_{i=1}^{n} \omega_i, \tag{3}$$

$$\bar{\omega^2} = \frac{1}{n}\sum_{i=1}^{n} \omega_i^2, \tag{4}$$

$$\bar{T} = \frac{1}{n}\sum_{i=1}^{n} T. \tag{5}$$

And from equations (3) and (4), the variance per axis is given by:

$$\sigma^2 = \bar{\omega^2} - (\bar{\omega})^2. \tag{6}$$

Since the angular rate should theoretically be zero if the device is stationary, if $\sigma^2$ is less than a threshold $\bar{\omega}$ can be used as an estimate of the angular rate bias at the current temperature $\bar{T}$. $\bar{\omega}, \bar{T}$ (collectively, referred to as a "calibration point") and the calibration time t can be stored in calibration database 110. Old values of $\bar{\omega}, \bar{T}$ stored in calibration database 110 that have a temperature close to $\bar{T}$ can be removed. Calibration database 110 can be updated as the device ages. For example, an aging algorithm can be applied where the oldest calibration points are removed from calibration database 110 on a scheduled basis or in response to a trigger event. For example, calibration database 110 can be pruned of all but the N latest calibration points in each 1° C. temperature bin. Additionally, $\vec{\omega}$ can be input to state estimator 108 as a measurement of the current angular sensor bias.

In some implementations, model parameter estimator 106 can track a linear approximation of the calibration points stored in calibration database 110. For example, as calibration points are added to calibration database 110, model parameter estimator 106 can track the following quantities per axis:

$$\sum_{i=1}^{n} T_i \tag{7}$$

$$\sum_{i=1}^{n} T_i^2, \tag{8}$$

$$\sum_{i=1}^{n} \omega_i, \tag{9}$$

$$\sum_{i=1}^{n} \omega_i T_i. \tag{10}$$

The angular rate bias versus temperature slope, m, can be computed per axis from equations (7)-(10) as:

$$m = \left[n\sum_{i=1}^{n} T_i^2 - \left(\sum_{i=1}^{n} T_i\right)^2\right]\left[n\sum_{i=1}^{n} (\omega_i T_i) - \left(\sum_{i=1}^{n} T_i\right)\left(\sum_{i=1}^{n} \omega_i\right)\right]. \tag{11}$$

The angular rate bias versus temperature offset, b, can be computed per axis from equations (7)-(10) as:

$$b = \left[n\sum_{i=1}^{n} T_i^2 - \left(\sum_{i=1}^{n} T_i\right)^2\right]\left[\left(\sum_{i=1}^{n} T_i^2\right)\left(\sum_{i=1}^{n} \omega_i\right) - \left(\sum_{i=1}^{n} T_i\right)\left(\sum_{i=1}^{n} \omega_i T_i\right)\right]. \tag{12}$$

Figure 2:
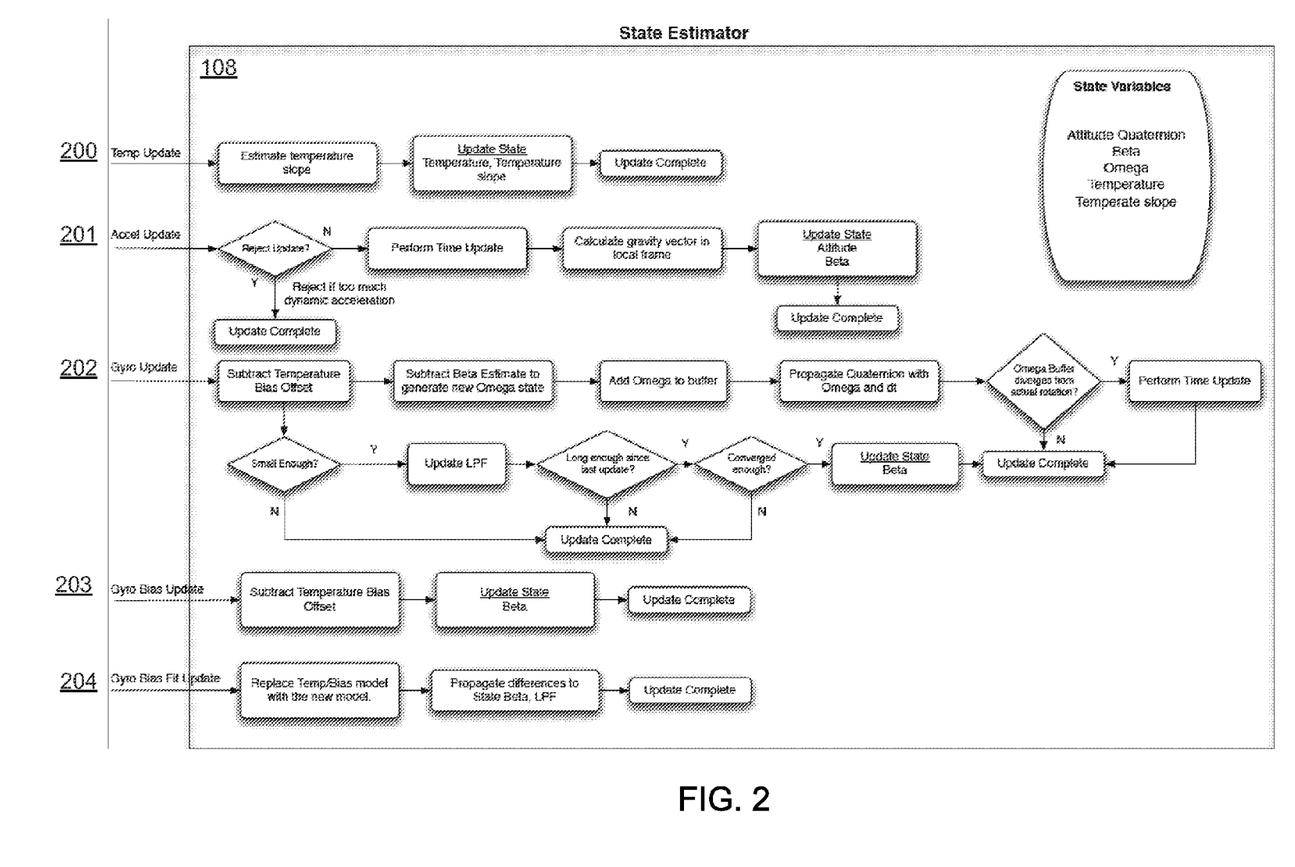
FIG. 2 is a flow diagram illustrating various exemplary processes performed by the state estimator of FIG. 1.

For three axis sensors, a temperature slope vector $\vec{m}$ and temperature bias offset vector $\vec{b} = [b_x, b_y, b_z]$ are input to state estimator 108, where these vector quantities are used to compute an estimated attitude of the device using an attitude estimation filter, as described in reference to FIG. 2.

FIG. 2 is a flow diagram illustrating various exemplary processes performed by the state estimator 108 of FIG. 1. In some implementations, state estimator 108 can implement update paths 200-204 for updating state variables. In this example, angular rate sensor 102 can be a three axis MEMS gyro.

A first path 200 can perform a temperature estimate update using a temperature estimation filter, the current temperature T and the estimated temperature slope vector in $\vec{m}$ received from model parameter estimator 106. The slope vector $\vec{m}$ and temperature bias offset vector $\vec{b}$ define a linear model that describes a base bias vector $\vec{b}_{base}$ for a given temperature T given by:

$$\vec{b}_{base} = \vec{m} * T + \vec{b}. \tag{13}$$

A bias delta vector $\vec{\beta}$ can then be defined by the difference between the true bias at a given time $\vec{b}_{true}$ and the base bias vector $\vec{b}_{base}$ as follows:

$$\vec{\beta} = \vec{b}_{true} - \vec{b}_{base}, \tag{14}$$

where the base bias vector $\vec{b}_{base}$ accounts for the bias over a long period of time and the bias delta vector $\vec{\beta}$ accounts for the bias for local (in time) variation.

A second update path 201 can perform an acceleration update using an acceleration vector $\vec{a}$ received from accelerometer 112. The acceleration vector $\vec{a}$ can be scale-corrected before it is input into state estimator 108. If the acceleration vector has too much dynamic acceleration the update can be completed without further action by state estimator 108. If the acceleration vector does not have too much dynamic acceleration, a time update can be performed and a gravity vector $\vec{g}$ can be computed in the local coordinate frame of the device. The gravity vector and other quantities can be used in an attitude estimation filter as described below.

A third update path 202 can perform a gyro update by first subtracting the base bias vector $\vec{b}_{base}$ from the angular rate vector $\vec{\omega}$ to generate a temperature compensated angular rate vector $\vec{\omega}_c = (\vec{\omega} - m*T - b) = [\omega_{cx} \; \omega_{cy} \; \omega_{cz}]$ and then subtracting the bias delta vector $\vec{\beta}$ from the compensated angular rate vector $\vec{\omega}_c$ to generate an estimated angular rate vector $\hat{\vec{\omega}} = (\vec{\omega}_c - \beta) = [\hat{\omega}_x \; \hat{\omega}_y \; \hat{\omega}_z]$ and storing the estimated angular rate vector in a buffer. The reference quaternion, $\vec{q}_{ref}$, can be propagated using equation (15) below:

$$q_{delta} = [\sin(|\hat{\vec{\omega}}|*dt/2)*\hat{\vec{\omega}}/|\hat{\vec{\omega}}|, \cos(|\hat{\vec{\omega}}|*dt/2)],$$

$$\vec{q}_{ref} = q_{delta} \otimes \vec{q}_{ref}, \quad (15)$$

where $\otimes$ is quaternion multiplication.

Other approximations or formulations for updating quaternion or direction cosine matrix formulations can also be used. If the estimated angular rate vector $\hat{\vec{\omega}}$ diverges from the actual angular rate vector $\vec{\omega}$, a time update can be performed. If the magnitude of the temperature compensated angular rate $\vec{\omega}_c$ is less than some predetermined threshold a low pass filter (LPF) can be updated as described below.

A fourth update path 203 can perform a gyro bias update by computing a estimated angular rate vector $\hat{\vec{\omega}}$ and updating the state of bias delta vector $\vec{\beta}$ using the attitude estimation filter.

A fifth update path 204 can perform a gyro bias linear fit update by replacing the temperature bias model in the attitude estimation filter with the new model provided, updating the bias delta vector $\vec{\beta}$ and the LPF appropriately.

Exemplary Kalman Filter Formulations

The temperature estimation filter and attitude estimation filter referenced above can be implemented using Kalman filter formulations to improve accuracy. In some implementations, two independent Kalman filters can be used: one to estimate temperature, and one to estimate attitude. The Kalman filters can be decoupled for computational efficiency reasons as well as logical reasons.

In some implementations, the temperature estimation filter can be a classic Kalman Filter with temperature T and temperature rate $\dot{T}$ as states. The temperature estimation filter state and temperature estimation filter transition matrix can be represented by:

$$X = \begin{pmatrix} T \\ \dot{T} \end{pmatrix}, \quad (16)$$

$$\Phi = \begin{pmatrix} 1 & \Delta t \\ 0 & 1 \end{pmatrix}. \quad (17)$$

The attitude estimation filter can be based on a multiplicative extended Kalman filter formulation. The filter can propagate the reference quaternion $\vec{q}_{ref}$ with the compensated angular rate vector $\vec{\omega}_c$. The attitude estimation filter state can include a local attitude error vector $\vec{\theta}$ derived from the reference quaternion $\vec{q}_{ref}$ and the bias delta vector $\vec{\beta}$. The attitude estimation filter state X, transition matrix $\Phi$, attitude process noise matrix Q and measurement matrix H for the accelerometer can be represented in continuous time format as follows:

$$X = \begin{pmatrix} \vec{\theta} \\ \vec{\beta} \end{pmatrix}, \quad (18)$$

$$\Phi = \begin{pmatrix} -|\vec{\omega}|_x & -I_{3\times 3} \\ O_{3\times 3} & -\lambda^{-1} \cdot I_{3\times 3} \end{pmatrix}, \quad (19)$$

$$Q = \begin{pmatrix} \text{diag}(N_\theta) & O_{3\times 3} \\ O_{3\times 3} & \text{diag}(N_\beta) \end{pmatrix}, \quad (20)$$

$$H_{acc}(|\hat{\vec{g}}|_x \quad O_{3\times 3}), \quad (21)$$

$$H_{bias} = (O_{3\times 3} \quad I_{3\times 3}) \quad (22)$$

where $\lambda$ is a Gauss-Markov time constant, $O_{n\times m}$ is an n×m zero matrix, $I_{n\times m}$ an n×m identity matrix, and $|\vec{\omega}|_x, |\hat{\vec{g}}|_x$ are left cross product matrices.

In practice, a second order discrete approximation can be used for the attitude estimation filter and temperature estimation filter. In the above formulations, an assumption is made that the process noise matrix Q for the attitude error and bias are independent and so can be specified by the matrix diagonals $N_\theta$ and $N_\beta$. The measurement matrix can be the accelerometer measurement matrix, which can be defined in terms of the filter's current estimate of gravity $\hat{\vec{g}}$ generated from the reference quaternion $\vec{q}_{ref}$. Measurement noise matrices R for the temperature estimation filter and attitude estimation filter are assumed diagonal and have quantities that can be determined empirically using simulations or other known statistical methods. Initial values for the error covariance matrices P can also be selected empirically using simulations or other known statistical methods.

The matrices described above can be used in an extended Kalman filter formulation, which includes a time update phase and a measurement update phase as follows:

A. Time Update
1. Propagate state $$\hat{\vec{x}}_k^- = \Phi \hat{\vec{x}}_{k-1} + B \vec{u}_{k-1}$$

2. Propagate error covariance $$P_k^- = \Phi P_{k-1} \Phi^T + Q$$

B. Measurement Update
1. Compute Kalman gain $$K_k = P_k^- H^T (H P_k^- H^T + R)^{-1}$$

2. Update estimate with measurement and Kalman gain $$\hat{\vec{x}}_k = \hat{\vec{x}}_k^- + K_k (\vec{z}_k - H \hat{\vec{x}}_k^-)$$

3. Update error covariance with Kalman gain $$P_k = (I - K_k H) P_k^-$$

Low Pass Bias Estimates

There can be a number of components that eventually contribute to a gyro bias estimate. In general, these components can be divided into two categories: bias/temperature model and bias delta from the temperature model.

Generally, a temperature/bias relationship is maintained in system 100, which defines the mean bias value for a given temperature over time. This is a long-term relationship. Shorter term variation from the mean bias at a given temperature—the bias delta vector ($\vec{\beta}$)—can be assumed to be a Gauss-Markov noise model.

The bias delta vector can be updated through the Kalman filter formulation. These updates can come in one of three ways: through an accelerometer measurement update, direct measurement update coming from motion detector 104 or direct measurement update coming from the LPF.

In some implementations, a long-term running average of the temperature compensated angular rate vector $\vec{\omega}_c$ can be an early estimate of the bias delta vector $\vec{\beta}$. The LPF can be implemented as a first order auto-regressive filter $LPF_n = \alpha_n \cdot LPF_{n-1} + (1-\alpha_n) \cdot \omega_n$ with a dynamic update rate. The compensated angular rate vector $\vec{\omega}_c$ values are fed into the LPF if the values are less than a predetermined threshold on the magnitude of the compensated angular rate vector. The update rate $\alpha_n$ can be chosen to be larger if the magnitude of $\vec{\omega}_c$ is larger, and smaller if the magnitude of $\vec{\omega}_c$ is smaller.

This estimate can be periodically applied (e.g., 5 Hz) as a direct measurement to the attitude estimation filter. The measurement noise can be modified to depend roughly on how long the LPF has been running. The purpose of the LPF is to allow for the update of $\vec{\beta}$ in regions where significant uncertainty exists as defined through the attitude estimation filter's covariance matrix. These updates can be performed even when the device is moving slowly.

Exemplary Interference Mitigation Module

The optional interference mitigation module 114 can use the reference quaternion output by state estimator 108 to detect changes in the external magnetic field vector. The module keeps track of the last known magnetometer measurement vector $\vec{m}_k$ at time k and the device's estimated attitude $A_k$ at time k, which can be provided by state estimator 108. Module 114 transforms the measurement vector $\vec{m}_k$ into a world coordinate frame using the inverse of $A_k$:

$$\vec{m}_k^w = A_k^{-1} \vec{m}_k \qquad (23)$$

At each offset-corrected magnetometer measurement vector $\vec{m}_i$ at time i, module 114 reads the current estimated attitude $A_i$ at time i and constructs a synthetic magnetometer measurement vector $\vec{m}_i^s$ at time i:

$$\vec{m}_i^s = A_i \vec{m}_k^w.$$

If the magnetometer measurement vector $\vec{m}_k$ expressed in the world frame is substantially constant, the angle between vectors $\vec{m}_i^s$ and $\vec{m}_i$, $$\theta_i = \cos^{-1} \frac{(m_i^s \cdot m_i)}{|\overline{m}_i^s||\overline{m}_i|}$$

should be zero. When the variance of $\theta_i$ within a defined window is below a threshold, and there are no other known sources of magnetometer interference present (e.g., a vibration source), the offset-corrected magnetometer measurement vector $\vec{m}_i$ can be used to calculate compass heading.

Otherwise, the synthetic magnetometer measurement vector $m_i^s$ can be used to calculate compass heading.

Exemplary Sensor Calibration Process Flow

Figure 3:
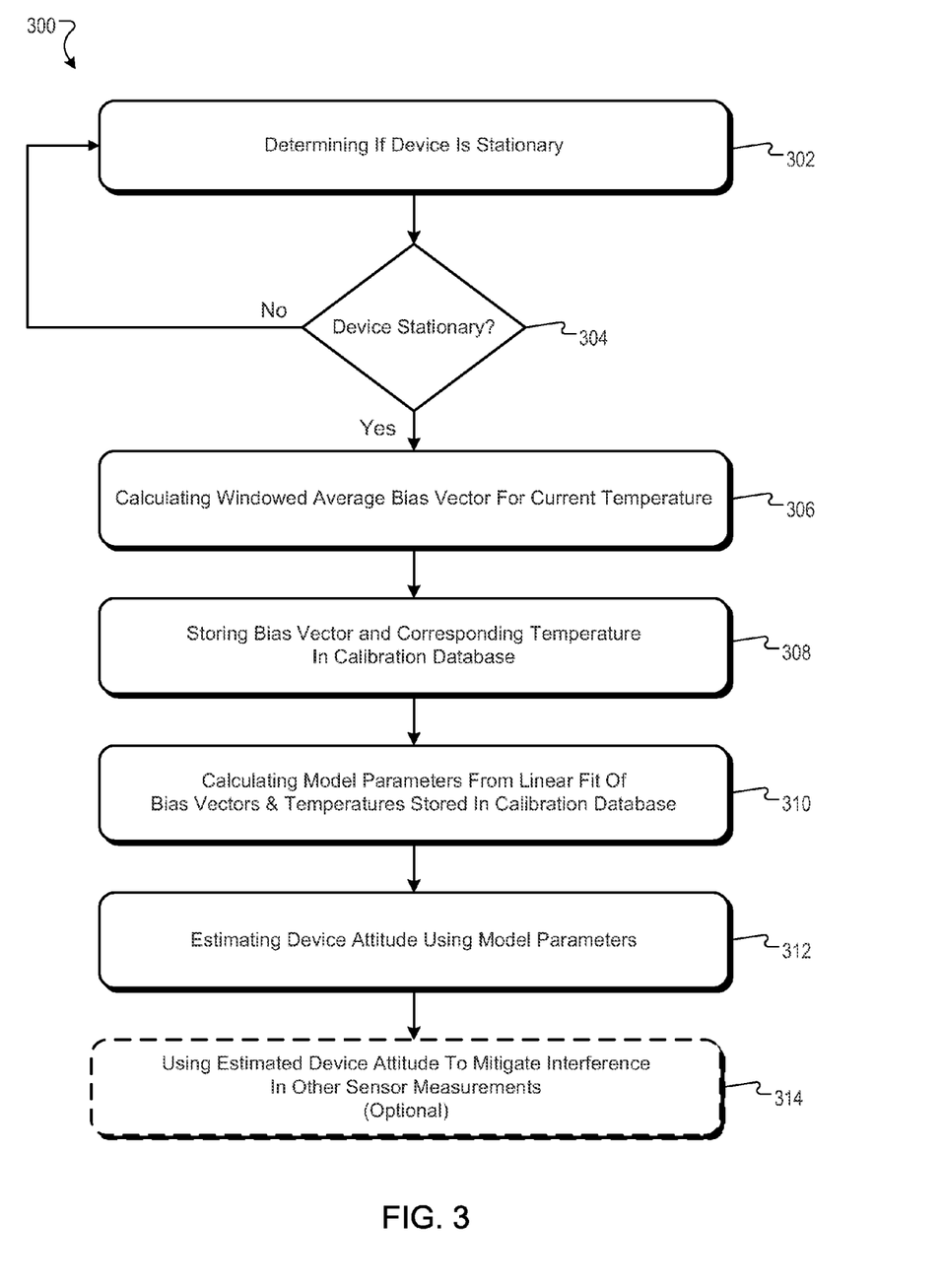
FIG. 3 is a flow diagram of an exemplary process for estimating model parameters and determining an estimated attitude based on the model parameters.

FIG. 3 is a flow diagram of an exemplary process 300 for estimating model parameters and determining an estimated attitude based on the estimated model parameters. Process 300 can be implemented by a sensor data calibration system of a device, such as sensor measurement calibration system 100.

In some implementations, process 300 can begin by determining if a device is stationary (302). For example, a motion detector (e.g., motion detector 104) can use angular rates from the angular rate sensor (e.g., MEMS gyro) to determine if the device is stationary. In some implementations, a variance of window averaged angular rates can be compared against a threshold value to determine if the device is stationary, as described in reference to FIG. 1. In other implementations, other sensor data can be used to detect when the device is stationary, such as accelerations from accelerometer 112.

If the device is determined to be stationary (304), a calibration opportunity exists and a window averaged bias vector for the current temperature can be calculated based on the angular rate data output by the angular rate sensor (306). The window averaged bias vector and a corresponding temperature can be stored in a calibration database (308). Model parameters can be calculated from a linear fit of the bias vectors and temperatures stored in the calibration database (310). The estimated attitude of the device can be determined using the model parameters (312). The estimating can be implemented in two independent estimation filters: one filter for estimating temperature and one filter for estimating attitude. The estimation filters can be implemented using Kalman filter formulations. The estimated attitude can optionally be used to mitigate interference in other sensor measurements (314), such as a magnetometer measurement.

Exemplary Device Architecture

Figure 4:
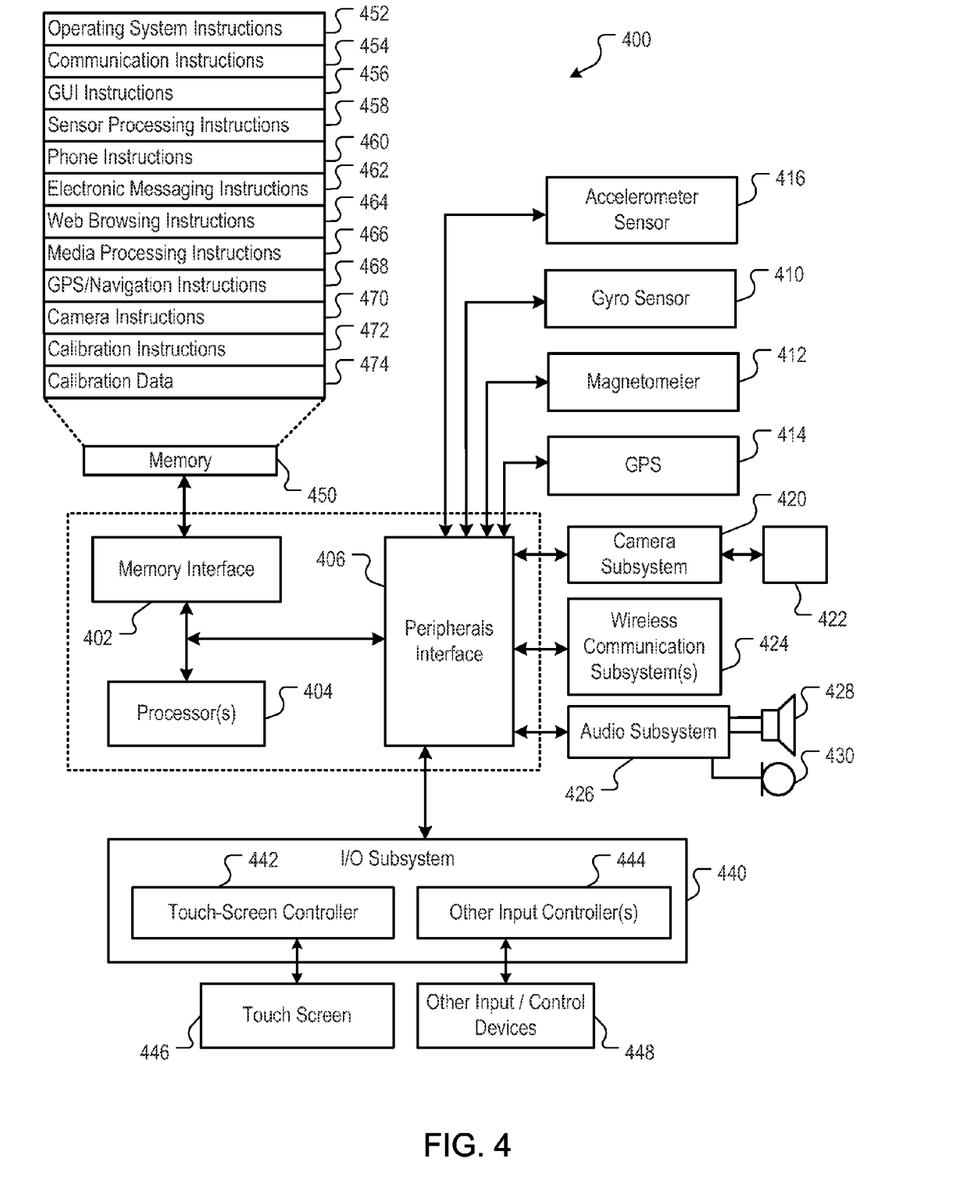
FIG. 4 is a block diagram of an exemplary hardware architecture for implementing the system and processes referenced in FIGS. 1-3.

FIG. 4 is a block diagram of an exemplary device hardware architecture for implementing the sensor calibration system 100 and processes referenced in FIGS. 1-3. The device can include memory interface 402, one or more data processors, image processors and/or processors 404, and peripherals interface 406. Memory interface 402, one or more processors 404 and/or peripherals interface 406 can be separate components or can be integrated in one or more integrated circuits. The various components in the device, for example, can be coupled by one or more communication buses or signal lines.

Sensors, devices, and subsystems can be coupled to peripherals interface 406 to facilitate multiple functionalities. For example, angular rate sensor 410 (e.g., a MEMS gyro), magnetometer sensor 412. Location processor 414 (e.g., GPS receiver) can be connected to peripherals interface 406 to provide geopositioning. Accelerometer 416 can also be connected to peripherals interface 406 to provide data that can be used to determine change of speed and direction of movement of the mobile device.

Camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which a mobile device is intended to operate. For example, a mobile device can include communication subsystems 424 designed to operate over a GSM network, a GPRS network, an EDGE network, a Wi-Fi or WiMax network, and a Bluetooth network. In particular, the wireless communication subsystems 424 can include hosting protocols such that the mobile device can be configured as a base station for other wireless devices.

Audio subsystem 426 can be coupled to a speaker 428 and a microphone 430 to facilitate voice-enabled functions, such as voice recognition, voice replication, digital recording, and telephony functions.

I/O subsystem 440 can include touch screen controller 442 and/or other input controller(s) 444. Touch-screen controller 442 can be coupled to a touch screen 446 or pad. Touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 446.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In one implementation, a pressing of the button for a first duration may disengage a lock of the touch screen or pad 446; and a pressing of the button for a second duration that is longer than the first duration may turn power to the device on or off. The user may be able to customize a functionality of one or more of the buttons. The touch screen 446 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes and instructions; and camera instructions 470 to facilitate camera-related processes and functions. The memory 450 may also store other software instructions (not shown), such as security instructions, web video instructions to facilitate web video-related processes and functions, and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 450. Memory 450 can include instructions for sensor measurement calibration 472 and sensor calibration data 474 (e.g., database 110 storing calibration points).

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information fro transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors of a mobile device, comprising:
receiving one or more sensor measurements from a sensor onboard the mobile device;
determining if the device is stationary based on the one or more sensor measurements;
at a first time, upon determining that the device is stationary, calculating one or more model parameters for a current temperature from the sensor measurements, wherein calculating the one or more model parameters includes calculating a measurement bias based on the one or more sensor measurements that are received when the mobile device is determined to be stationary at the first time;
storing, in a calibration database, a calibration point, the calibration point comprising the measurement bias and the current temperature; and
at a second time that occurs after the first time, estimating an attitude of the device using the measurement bias based on a temperature measured at the second time and the temperature of the calibration point.

2. The method of claim 1, further comprising:
mitigating interference in other sensor measurements using the estimated attitude.

3. The method of claim 1, where the sensor measurements are angular rate and the model parameters include measurement bias and temperature slope.

4. The method of claim 1, where determining whether the device is stationary, comprises:
calculating a variance from window averaged sensor measurements; and
determining if the variance exceeds a threshold.

5. The method of claim 1, where calculating one or more model parameters, comprises:
calculating a linear fit of calibration points and temperature slope.

6. The method of claim 1, where estimating an attitude comprises:
estimating temperature using a first estimation filter having a filter state including temperature and temperature rate; and
estimating an attitude of the device using a second estimation filter having a filter state including local attitude error and measurement bias.

7. The method of claim 6, where the first and second estimation filters are Kalman filter formulations.

8. The method of claim 1, further comprising:
maintaining a running average of temperature compensated angular rates as an estimate of measurement bias.

9. The method of claim 8, where maintaining a running average comprises:
filtering angular rates using a low pass filter with a dynamic update rate that is selected based on magnitudes of the angular rates.

10. A system for estimating an attitude of a mobile device, comprising:
a sensor onboard the mobile device;
a processor coupled to the sensor and configured to execute instructions which cause the processor to perform operations comprising:
receiving one or more sensor measurements from the sensor;
determining if the device is stationary based on the one or more sensor measurements;
at a first time, upon determining that the device is stationary, calculating one or more model parameters for a current temperature from the sensor measurements, wherein calculating the one or more model parameters includes calculating a measurement bias based on the one or more sensor measurements that are received when the mobile device is determined to be stationary at the first time storing, in a calibration database, a calibration point, the calibration point comprising the measurement bias and the current temperature; and at a second time that occurs after the first time, estimating an attitude of the device using the measurement bias based on a temperature measured at the second time and the temperature of the calibration point.

11. The system of claim 10, where the processor is configured to execute instructions to mitigate interference in other sensor measurements using the estimated attitude.

12. The system of claim 10, where the sensor measurements are angular rate and the model parameters include measurement bias and temperature slope.

13. The system of claim 10, where the processor is configured to execute instructions to calculate a variance from window averaged sensor measurements, and to determine if the variance exceeds a threshold.

14. The system of claim 10, where the processor is configured to execute instructions to calculate a linear fit of calibration points and temperature slope.

15. The system of claim 10, where the processor is configured to execute instructions to estimate temperature using a first estimation filter having a filter state including temperature and temperature rate, and to estimate an attitude of the device using a second estimation filter having a filter state including local attitude error and measurement bias.

16. The system of claim 15, where the first and second estimation filters are Kalman filter formulations.

17. The system of claim 10, where the processor is configured to execute instructions to maintain a running average of temperature compensated angular rates as an estimate of measurement bias.

18. The system of claim 17, where the processor is configured to execute instructions to filter angular rates using a low pass filter with a dynamic update rate that is selected based on magnitudes of the angular rates.

19. The system of claim 10, where the sensor is a gyroscope.

20. A non-transitory storage device storing a computer program operable to cause one or more processors of a mobile device to perform operations comprising:

receiving one or more sensor measurements from a sensor onboard the mobile device;

determining if the device is stationary based on the one or more sensor measurements;

at a first time, upon determining that the device is stationary, calculating one or more model parameters for a current temperature from the sensor measurements, wherein calculating the one or more model parameters includes calculating a measurement bias based on the one or more sensor measurements that are received when the mobile device is determined to be stationary at the first time;

storing, in a calibration database, a calibration point, the calibration point comprising the measurement bias and the current temperature; and at a second time that occurs after the first time, estimating an attitude of the device using the measurement bias based on a temperature measured at the second time and the temperature of the calibration point.

* * * * *